United States Patent
Huang et al.

(10) Patent No.: US 10,698,261 B1
(45) Date of Patent: Jun. 30, 2020

(54) BACKLIGHT MODULE

(71) Applicant: AU OPTRONICS CORPORATION, Hsin-Chu (TW)

(72) Inventors: Chih-Chung Huang, Hsin-Chu (TW); Yu-Chuan Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/456,512

(22) Filed: Jun. 28, 2019

Related U.S. Application Data

(60) Provisional application No. 62/775,480, filed on Dec. 5, 2018.

(30) Foreign Application Priority Data

Feb. 27, 2019 (TW) .............................. 108106901 A

(51) Int. Cl.
*G02F 1/13357* (2006.01)

(52) U.S. Cl.
CPC .. *G02F 1/133608* (2013.01); *G02F 1/133605* (2013.01); *G02F 1/133603* (2013.01); *G02F 2001/133628* (2013.01)

(58) Field of Classification Search
CPC ......... G02F 1/133608; G02F 1/133605; G02F 1/133603; G02F 2001/133628
See application file for complete search history.

(56) References Cited

U.S. PATENT DOCUMENTS

| | | | |
|---|---|---|---|
| 7,338,194 B2 | 3/2008 | Chen | |
| 2005/0195620 A1* | 9/2005 | Hwang | G02F 1/133608 362/581 |
| 2009/0052176 A1* | 2/2009 | Ke | G02F 1/133604 362/249.01 |
| 2017/0059769 A1* | 3/2017 | Ma | G02F 1/133308 |

FOREIGN PATENT DOCUMENTS

| | | |
|---|---|---|
| CN | 101403490 A | 4/2009 |
| CN | 202253486 U | 5/2012 |
| CN | 102606963 A | 7/2012 |
| CN | 205049842 U | 2/2016 |
| CN | 107167950 A | 9/2017 |
| CN | 206805085 U | 12/2017 |
| CN | 207114819 U | 3/2018 |
| TW | 201227641 A | 7/2012 |

* cited by examiner

*Primary Examiner* — Kevin Quarterman
(74) *Attorney, Agent, or Firm* — WPAT, PC

(57) ABSTRACT

A backlight module having a bearing plate and a light module is provided. The bearing plate has a bearing surface, which includes a trough, a first groove, a first inner stage, and a first outer stage. The first groove is disposed close to the trough. The first inner stage is between the trough and the first groove while the first outer stage is on the side of the first groove opposite to the first inner stage. The light module is disposed on the bearing surface and corresponds to the trough. Comparing to the first inner stage, the first outer stage is more protruding toward the light module.

28 Claims, 10 Drawing Sheets

BACKLIGHT MODULE

BACKGROUND

Technical Field

The present invention relates to a backlight module, and specifically, to a backlight module applied to a display device.

Related Art

In current display technologies, a large quantity of backlight modules have been widely used as providers of lights. However, in accordance with structural requirements, such as overall thinning, a large area, and bezel-lessness, on display devices, design and assembly of backlight modules usually need to be adjusted, and specification requirements, such as brightness evenness and good heat dissipation performance, should also be taken into consideration.

In conventional design, a plurality of light-emitting diode lamp strips is disposed on a substrate. However, during a disposition process, the lamp strips may skew because of an assembly tolerance or uneven glue distribution, and affect an optical effect. In addition, because the substrate may be provided with some grooves to form outward-protruding ribs for structural reinforcing or wiring, in a machining process of forming the grooves, the substrate is likely to be caused to be uneven, further resulting in inclination or uneasy assembly of the lamp strips disposed thereon. Moreover, how to also effectively help the lamp strips dissipate heat in a grooved area is also a problem that needs to be resolved.

SUMMARY

One of objectives of the present invention is to provide a backlight module, capable of reducing cases of skewing or improper assembly of a light module thereon.

One of the objectives of the present invention is to provide a backlight module, capable of reinforcing stability of a connection between a light module and a bearing surface.

One of the objectives of the present invention is to provide a backlight module, capable of improving a heat dissipation effect in a groove.

A backlight module of the present invention includes a bearing plate and a light module. The bearing plate has a bearing surface, where the bearing surface includes: a trough, a first groove, a first inner stage, and a first outer stage. The first groove is disposed close to the trough. The first inner stage is disposed between the trough and the first groove; and the first outer stage is located on a side of the first groove opposite to the trough. The light module is disposed on the bearing surface and corresponds to the trough. Comparing to the first inner stage, the first outer stage is more protruding toward the light module.

In another application, a backlight module of the present invention includes a bearing plate and a light module. A bearing face of the bearing plate includes: a light bearing area, a groove, and a protruding portion, where the groove is disposed on a side of the light bearing area, and the protruding portion is disposed between the light bearing area and the groove, and distributed along the groove. The groove is depressed relative to the light bearing area, and the protruding portion protrudes relative to the light bearing area. The light module is disposed on the light bearing area, and the protruding portion is distributed along a side of the light module.

In another application, a backlight module of the present invention includes a bearing plate, a cooling fin, and a light module. A bearing surface of the bearing plate has a groove, the groove has an inner face and a first extending direction, and the cooling fin is disposed inside the groove. The cooling fin has a first portion, a second portion, and a third portion, where the third portion is connected to the first portion and the second portion separately, and a space is formed between the first portion and the second portion. The light module at least partially covers the groove, and has a bottom face. The first portion is connected to the bottom face of the light module, and the second portion is connected to the inner face of the groove. In such design, after being absorbed by the first portion from the light module, heat may be transferred to the bearing plate through the third portion and the second portion, thereby achieving a heat dissipation effect.

DETAILED DESCRIPTION

Figure 1:
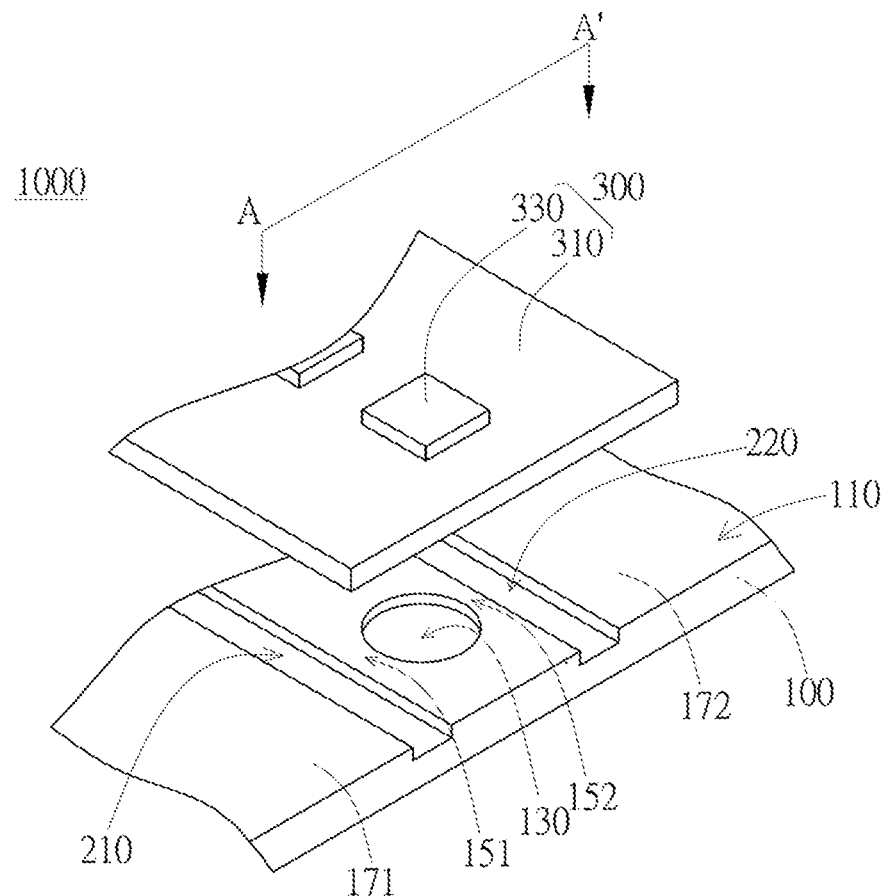
FIG. 1 is an exploded view of elements of an embodiment of a backlight module.

Implementations of a connection assembly disclosed by the present invention are described below by using particular and specific embodiments with reference to the drawings, and a person skilled in the art may learn of advantages and effects of the present invention from the disclosure of this specification. However, the following disclosure is not intended to limit the protection scope of the present invention, and a person skilled in the art may carry out the present invention by using other different embodiments based on different viewpoints without departing from the concept and spirit of the present invention. In the accompanying drawings, plate thicknesses of layers, films, panels, regions, and the like are enlarged for clarity. Throughout the specification, same reference numerals indicate same elements. It should be understood that when an element such as a layer, film, region or substrate is referred to as being "on" or "connected" to another element, it may be directly on or connected to the another element, or intervening elements may also be present. In contrast, when an element is referred to as being "directly on" or "directly connected to" another element, there is no intervening element present. As used herein, "connection" may refer to a physical and/or electrical connection. Further, "electrical connecting" or "coupling" may indicate that another element exists between two elements.

It should be noted that the terms "first", "second", "third", and the like that are used in the present disclosure can be used for describing various elements, components, regions, layers and/or portions, but the elements, components, regions, layers and/or portions are not limited by the terms. The terms are merely used to distinguish one element, component, region, layer, or portion from another element, component, region, layer, or portion. Therefore, the "first element", "component", "region", "layer", or "portion" discussed below may be referred to as a second element, component, region, layer, or portion without departing from the teaching of this disclosure.

In addition, relative terms, such as "down" or "bottom" and "up" or "top", are used to describe a relationship between an element and another element, as shown in the figures. It should be understood that the relative terms are intended to include different orientations of a device in addition to orientations shown in the figures. For example, if a device in a figure is turned over, an element that is described to be on a "lower" side of another element is directed to be on an "upper" side another element. Therefore, the exemplary terms "down" may include orientations of "down" and "up" and depends on a particular orientation of an accompanying drawing. Similarly, if a device in a figure is turned over, an element that is described as an element "below" another element or an element "below" is directed to be "above" another element. Therefore, the exemplary terms "below" or "below" may include orientations of up and down.

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Further, as used herein, "about", "approximately", or "substantially" may depend on optical properties, etch properties, or other properties to select a more acceptable range of deviations or standard deviations without one standard deviation for all properties.

The present invention provides a backlight module, and preferably, the backlight module is applicable to a display device. The present invention also provides a display device using the foregoing backlight module, preferably including: a non-self luminous display panel such as a liquid crystal display panel or an electro-phoretic display panel, and preferably being applicable to a computer display, a television, a monitor, and an on-board unit. In addition, the display device may alternatively be applied to another electronic device, for example, as a display screen of a mobile phone, a digital camera, a handheld game device, or the like. The above are merely examples, and this is not limited thereto.

FIG. 1 is an exploded view of elements of a backlight module 1000 of the present invention. In the embodiment shown in FIG. 1, the backlight module 1000 includes a bearing plate 100 and a light module 300. In this embodiment, the bearing plate 100 is a substrate of the backlight module, and is made of metal, but is not limited thereto. The bearing plate 100 has a bearing surface 110 capable of bearing the light module 300. The bearing surface 110 includes a trough 130, a first groove 210, a first inner stage 151, and a first outer stage 171. As shown in FIG. 1, the trough 130 may be configured to accommodate a glue, and a shape of the trough 130 may be a circle, a square, an elongated shape, or another shape. The first groove 210 is disposed close to the trough 130. In the embodiment shown in FIG. 1, the first groove 210 is a groove that substantially extends along a direction $D_{210}$, and is located on a side of the trough 130. The first inner stage 151 is disposed between the trough 130 and the first groove 210, and the first outer stage 171 is located on a side of the first groove 210 opposite to the trough 130. In other words, the first groove 210 is a dividing line between the first inner stage 151 and the first outer stage 171.

Figure 2:
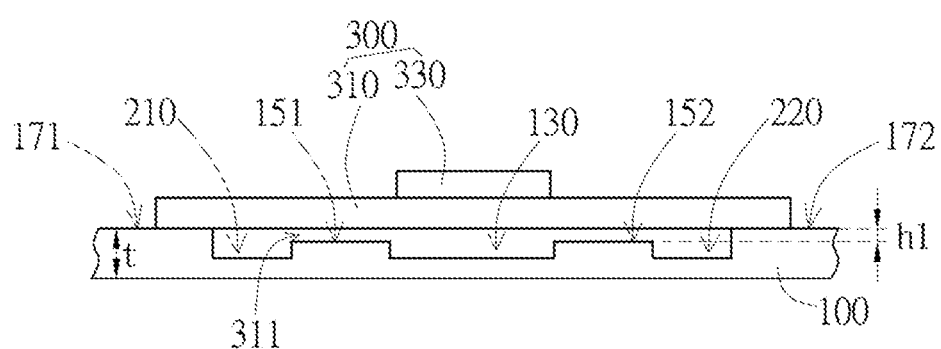
FIG. 2 is a cross-sectional view of the embodiment shown in FIG. 1.

FIG. 2 is a cross-sectional view of AA' in FIG. 1. In a preferred embodiment, as shown in FIG. 2, a stage height of the first inner stage 151 is lower than a stage height of the first outer stage 171. In addition, a plate thickness of a portion of the bearing plate 100 corresponding to the first inner stage 151, for example, is less than a plate thickness of a portion of the bearing plate 100 corresponding to the first outer stage 171. In other words, for example, thicknesses of some areas of the bearing plate 100 may be reduced by cutting or etching, or in another shaping manner, to reduce the stage height of the first inner stage 151. However, in different embodiments, an effect that the first inner stage 151 is lower than the first outer stage 171 may be produced by punching or bending or in another plate machining manner.

In addition, in this embodiment, the bearing surface 110 also includes a second groove 220, a second inner stage 152, and a second outer stage 172. As shown in FIG. 1 and FIG. 2, the second groove 220 is disposed in juxtaposition with the first groove 210, and on another side of the trough 130 relative to the first groove 210. In other words, the trough 130 is located in an elongated area between the first groove 210 and the second groove 220. In this embodiment, the second groove 220 is alternatively another groove substantially extending along the same direction $D_{210}$ and is substantially parallel to the first groove 210. However, it is not limited thereto. The second inner stage 152 is disposed between the trough 130 and the second groove 220, and the second outer stage 172 is located on a side of the second groove 220 opposite to the trough 130. In other words, the second groove 220 is a dividing line between the second inner stage 152 and the second outer stage 172. In this embodiment, the first inner stage 151 and the second inner stage 152 are different portions of a stage located between the first groove 210 and the second groove 220. When the glue is dispensed into the trough 130, and the glue overflows from the trough 130, the glue may enter into the first groove 210 through the first inner stage 151, or enter into the second groove 220 through the second inner stage 152. In addition, in different embodiments, the first groove 210 may be disposed alone, and the first groove 210 is not limited to being provided in pair with the second groove 220.

As shown in FIG. 1 and FIG. 2, the light module 300 is disposed on the bearing surface 110 and corresponds to the trough 130. In this embodiment, the light module 300 is disposed to cover the trough 130. As shown in FIG. 2, comparing with the first inner stage 151, the first outer stage 171 protrudes toward the light module 300 by a first height $h_1$. Preferably, if the portion of the bearing plate 100 corresponding to the first outer stage 171 has a plate thickness t, the first height $h_1$ is not greater than 20% of the plate thickness t.

In this embodiment, the first outer stage 171 of the bearing plate 100 may be used to bear the light module 300. Specifically, as shown in FIG. 1 and FIG. 2, the light module 300 may include a circuit substrate 310 and a light 330. The circuit substrate 310 preferably is a rigid circuit board, or may be a flexible circuit board or another substrate bearing a circuit. In this embodiment, the circuit substrate 310 forms an elongated shape, and extends along the first groove 210. An end, for example, a long edge, of the circuit substrate 310 is supported by the first outer stage 171, and another, opposite end may be supported by the second outer stage 172, so that the circuit substrate 310 is disposed across and covers the first groove 210 and the trough 130. Because the stage height of the first inner stage 151 is lower than the stage height of the first outer stage 171, there is a gap 311 between a bottom face of the circuit substrate 310 and the first inner stage 151. Further, if the light module directly abuts against the glue during disposition, the light module is likely to skew. However, because the light module 300 abuts against the first outer stage 171 and the second outer stage 172 and is supported by the first outer stage 171 and the second outer stage 172, the present invention has an advantage of avoiding the light module 300 from skewing.

As shown in FIG. 1 and FIG. 2, the light 330 is disposed on the circuit substrate 310. In this embodiment, a vertical projection range of the light 330 on the bearing surface 110 at least partially overlaps a range of the trough 130. By means of such a setting, in addition to that a fastening effect is produced by using the glue, a heat dissipation effect may be provided. Because of a location setting of a corresponding light 330, heat can be conducted rapidly, thereby effectively dissipating heat.

Figure 3:
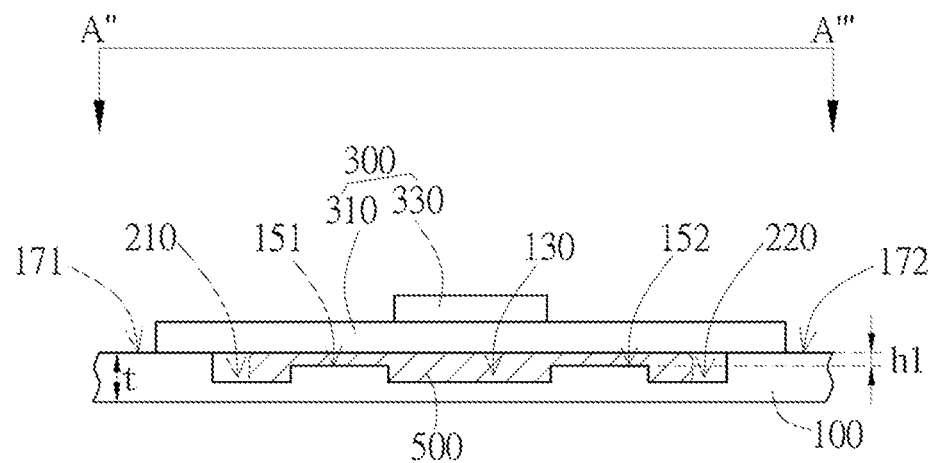
FIG. 3 is a cross-sectional view of the embodiment shown in FIG. 2 added with a glue.

In this embodiment, when it is attempted to fasten the light module 300 to the bearing plate 100, the glue is first configured on the trough 130 of the bearing plate 100, and then, the light module 300 is configured on the bearing plate. Before the glue located inside the trough 130 is cured, the glue is extruded by the light module 300 and partially overflows to exceed an edge of the trough 130. FIG. 3 is a cross-sectional view of AA' in FIG. 1, where a glue is filled. More specifically, as shown in FIG. 3, the backlight module also includes a glue 500, at least partially distributed between the trough 130 and the circuit substrate 310 of the light module 300, to connect the light module 300 onto the bearing plate 100. When the glue 500 dispensed inside the rough 130 overflows, a part of the glue 500 may be accommodated between the first inner stage 151 lower than the first outer stage 171 and the circuit substrate 310. This part of glue 500 may produce an effect of a connection between the circuit substrate 310 and the first inner stage 151, to increase an area of gluing. When there is more glue 500, a part of glue 500 may be distributed inside the first groove 210 by flowing through the first inner stage 151, to reduce a probability that the light module 300 is jacked up because of overflowing of the glue.

Figure 4:
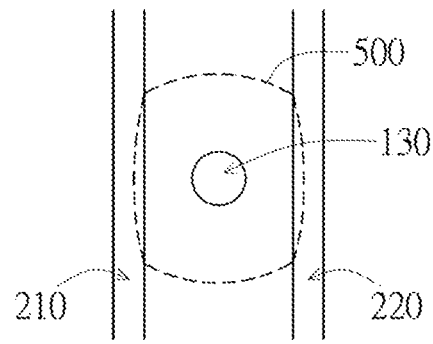
FIG. 4 is a top view of an embodiment of a backlight module.

In addition, because of disposition of the first groove 210 and the second groove 220, an overflow range of the glue 500 may alternatively be limited. For example, FIG. 4 is a top view of A"A'" in FIG. 3. As shown in FIG. 4, when the glue 500 overflows from the trough 130, the glue 500 may only overflow for a relatively long distance in a direction parallel to the first groove 210 and the second groove 220, and an overall overflow range is below the circuit substrate 310. In a direction perpendicular to the first groove 210 and the second groove 220, because of being limited by the first groove 210 and the second groove 220, the glue does not overflow to exceed a width range of the circuit substrate 310.

Figure 5:
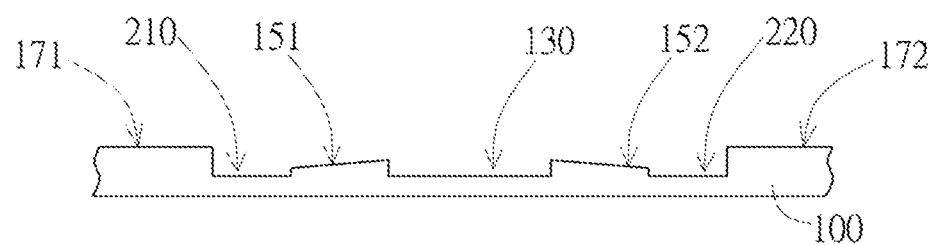
FIG. 5 is a cross-sectional view of an embodiment of another bearing plate.

FIG. 5 shows another embodiment of a bearing plate 100. As shown in FIG. 5, the first inner stage 151 inclines downward from an end of the trough 130 toward an end of the first groove 210. By means of such a setting, the glue that overflows from the trough 130 is more likely to flow into the first groove 210, to improve a speed of guiding out the overflowing glue.

Figure 6:
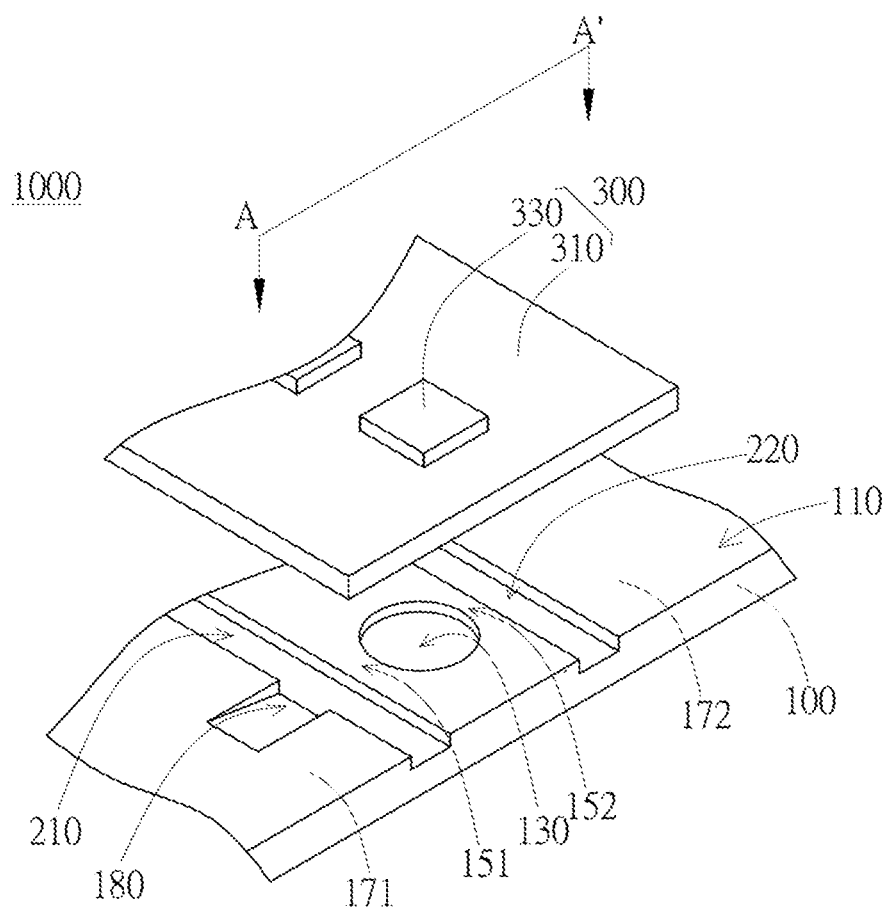
FIG. 6 is an exploded view of elements of another embodiment of a backlight module.
Figure 7A:
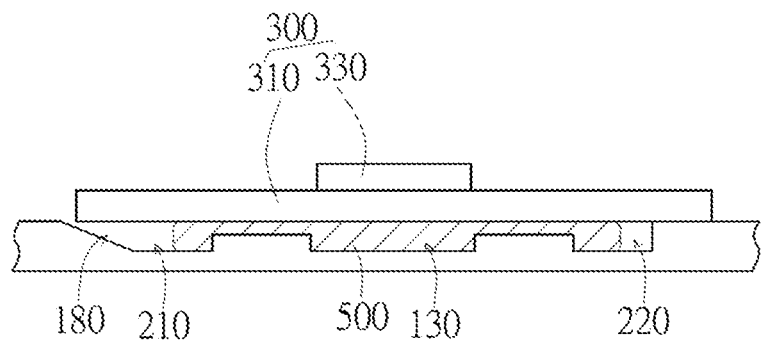
FIG. 7A and FIG. 7B are cross-sectional views of the embodiment shown in FIG. 6.

FIG. 6 is an exploded view of elements of a backlight module 1000 of the present invention. In the embodiment shown in FIG. 6, a depressed portion 180 provided on the bearing surface 110 at the first outer stage 171. The depressed portion 180 is depressed downward from the first outer stage 171, and is in communication with the first groove 210. In addition, the depressed portion 180 is at least partially uncovered by the circuit substrate 310 (shown in FIG. 7A, where FIG. 7A is a cross-sectional view of BB' in FIG. 6), and may form an opening on the first outer stage 171 close to a side edge of the circuit substrate 310, but the opening is not completely shielded by the circuit substrate 310. When the circuit substrate 310 and the bearing plate 100 need to be separated, a proper tool may be extended from the opening into the depressed portion 180, to lever up the circuit substrate 310 from a bottom of the circuit substrate 310. Preferably, the depressed portion 180 inclines toward the bottom of the first groove 210, so that the tool is more likely to be guided into the depth of the depressed portion 180.

Figure 7B:
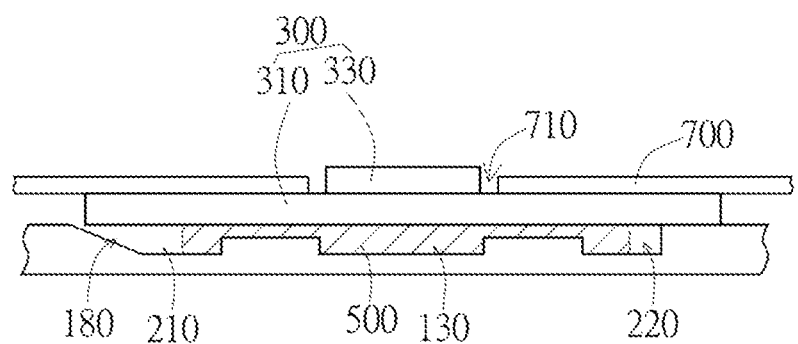

FIG. 7B is a cross-sectional view of BB' in FIG. 6, where a reflection layer is further disposed. More specifically, in the embodiment shown in FIG. 7, the backlight module additionally includes a reflection layer 700. The reflection layer 700 covers the bearing surface 110, and has a plurality of openings 710 in correspondence to the light 330, so that light rays emitted from the light 300 are emitted out of the reflection layer 700. In this preferred embodiment, the light 330 extends from the opening 710 out of the reflection layer 700, and the reflection layer 700 at least partially covers the circuit substrate 310 of the light module 300. By means of such a setting, effects of preventing glue overflowing and avoiding the reflection layer from skewing may be further improved.

Figure 8:
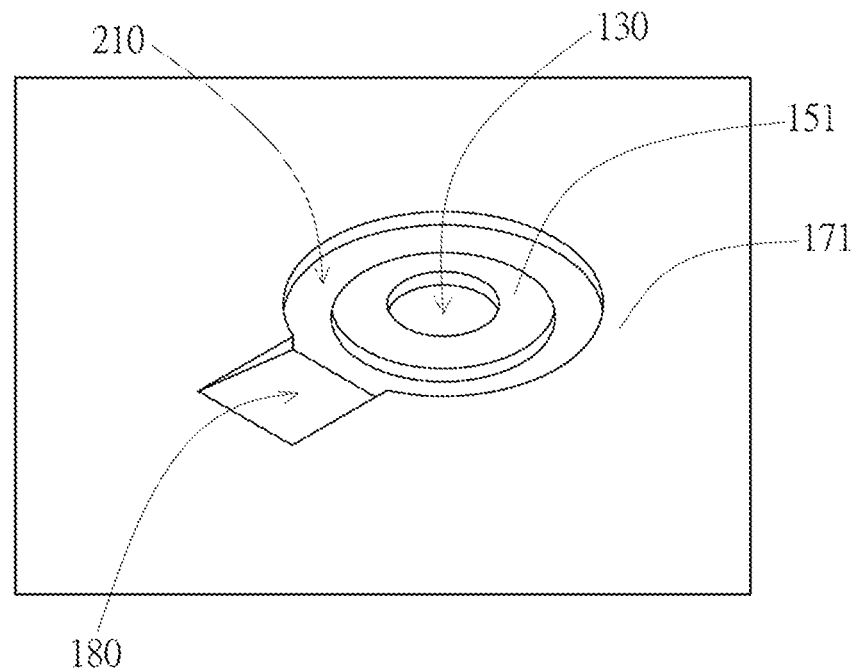
FIG. 8 is a schematic diagram of another embodiment of a bearing plate.

FIG. 8 shows another embodiment of a backlight module. In this embodiment, the first groove 210 forms a ring shape, and surrounds the trough 130. As shown in FIG. 8, the first groove 210 forms a closed circular ring. However, in different embodiments, the first groove 210 may alternatively form a ring in another shape, for example, an elliptic ring, a square ring, a polygonal ring, or an irregular ring. In addition, the first groove 210 may alternatively form a semi-closed or a vortex-type ring structure. Furthermore, the first inner stage 151 also forms a ring shape accordingly, and surrounds an outer side of the trough 130. By means of such design, the glue that overflows because of being pressed or another reason after dispensing may alternatively be controlled to be guided into the first inner stage 151 or enter into the first groove 210, to reduce a possibility of jacking up the light module 300.

In addition, in a preferred embodiment, a capacity of the first groove 210 is preferably is not greater than two times a capacity of the trough 130. That is, an effect of blocking overflowing glue can be produced without occupying too much area of the bearing surface 110. In addition, an outer side of the first groove 210 may alternatively be selectively additionally provided with, as the embodiment shown in FIG. 6, a depressed portion 180 in communication with the first groove 210, to improve convenience during reworking and disassembling.

Figure 9:
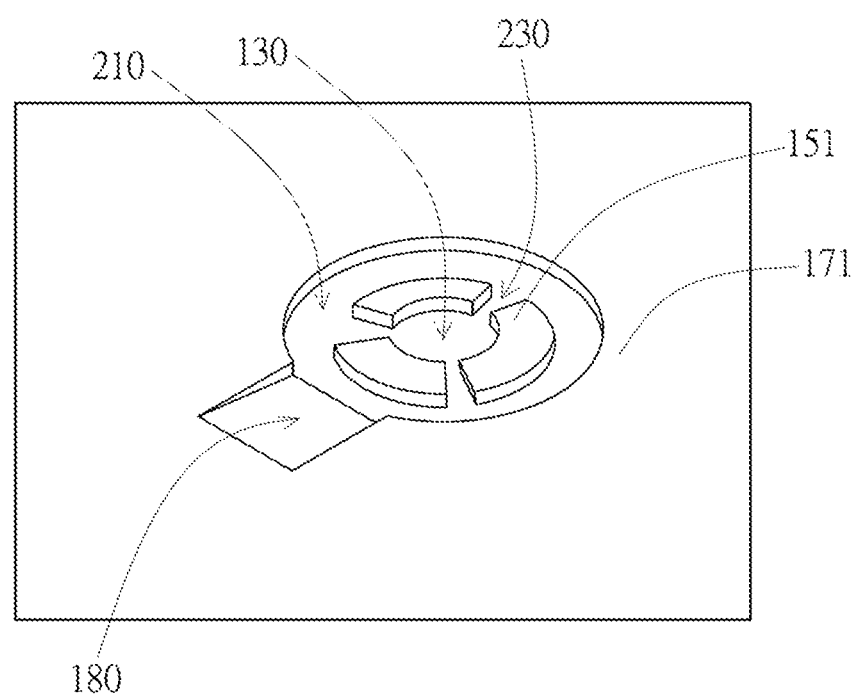
FIG. 9 is a schematic diagram of a variant embodiment of the embodiment shown in FIG. 8.

In the embodiment shown in FIG. 9, a communication groove 230 is additionally provided to be in communication with the trough 130 and the first groove 210 separately. Therefore, when a volume of the glue exceeds the capacity of the trough 130, the glue is preferentially guided out through the communication groove 230. In this embodiment, a total of three even, equiangular, and radial communication grooves 230 are disposed. Therefore, the guided glue may be relatively evenly distributed. However, it is not limited thereto. By means of such design, the overflowing glue may be guided toward a preset direction, so that a product assembly result is controlled better.

Figure 10:
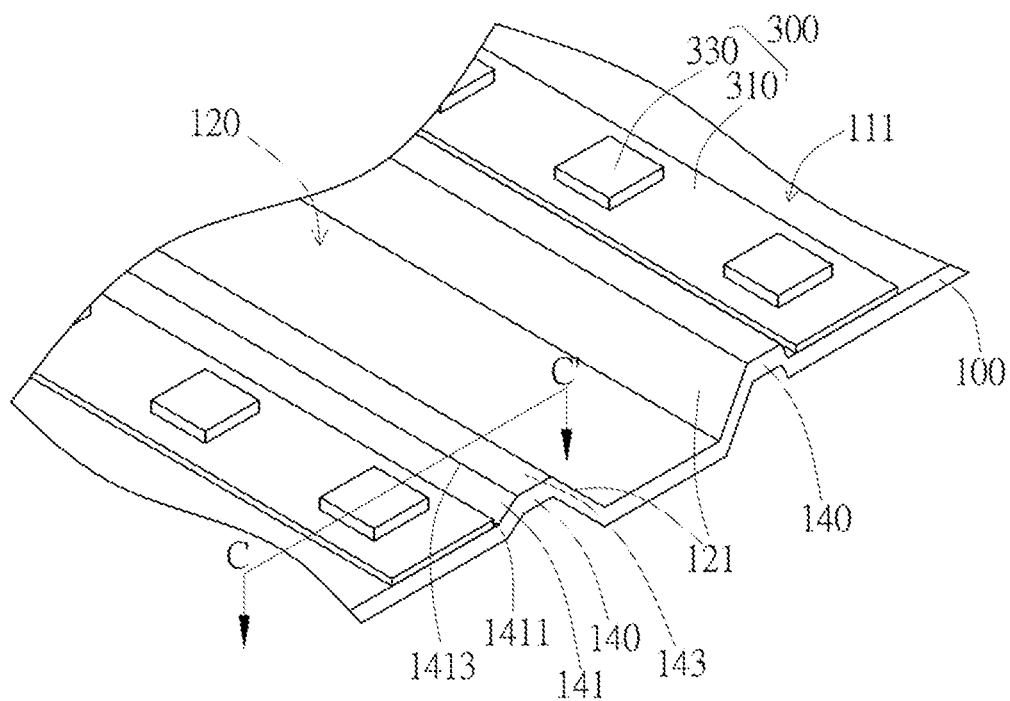
FIG. 10 is a schematic diagram of another embodiment of a backlight module.
Figure 11:
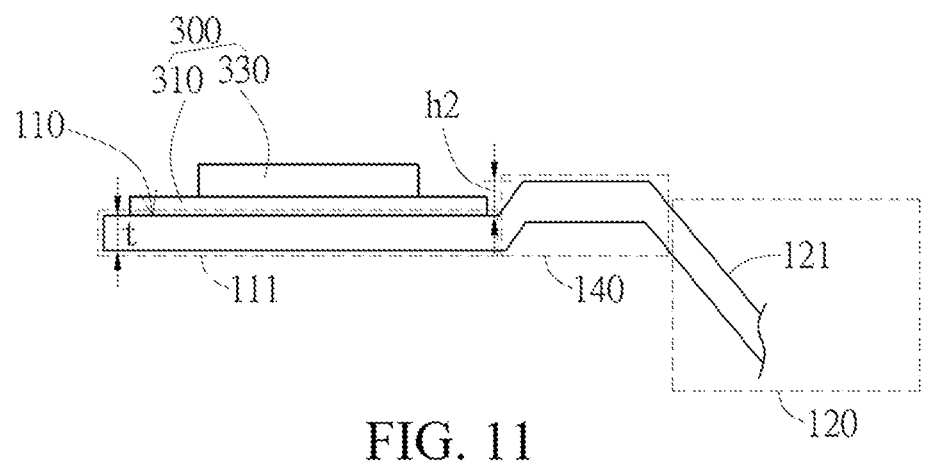
FIG. 11 is a cross-sectional view of the embodiment shown in FIG. 10.

FIG. 10 shows another embodiment of a backlight module. In this embodiment, the backlight module includes a bearing plate 100 and a light module 300. A bearing surface 110 on the bearing plate 100 includes a light bearing area 111, a groove 120, and a protruding portion 140. The groove 120 is disposed on a side of the light bearing area 111, and is depressed relative to the light bearing area 111. The groove 120, for example, is disposed at least partially along an extending direction of a side of the light bearing area 111. The groove 120 may be used for reinforcing overall strength of the bearing plate 100 or may be used for accommodating elements such as a circuit. However, it is not limited to the foregoing purposes. The protruding portion 140 is disposed between the light bearing area 111 and the groove 120, and is distributed along the groove 120. The protruding portion 140 protrudes relative to the light bearing area 111. FIG. 11 is a cross-sectional view of CC' in FIG. 10. As shown in FIG. 11, the bearing plate 100 has a plate thickness t, and a height $h_2$ by which the protruding portion 140 protrudes relative to the light bearing area 111 is not less than ⅓ of the plate thickness t.

As shown in FIG. 10, the light module 300 is disposed on the light bearing area 111, and the protruding portion 140 is distributed along a side of the light module 300. Preferably, the light module 300 forms an elongated shape, and the protruding portion 140 is distributed along a long edge of the light module 300, and therefore, may form a protruding rib. In this embodiment, the light bearing area 111, the protruding portion 140, and the groove 120 are formed in a metal plate machining manner such as bending or punching. However, it is not limited thereto. For example, an additional strip-shaped structure may be disposed by welding, gluing, or molding, or in another manner.

As shown in FIG. 10 and FIG. 11, the groove 120 has a groove sidewall 121, and in this embodiment, the protruding portion 140 is disposed at a location of a border between the groove sidewall 121 and the light bearing area 111.

By means of such a setting, disposition of the protruding portion 140 may reduce cases in which a portion of the light bearing area 111 close to the groove 120 inclines toward the groove 120 because of machining or another reason. In addition, the protruding portion 140 may alternatively have an effect of positioning the light module 300, so that the light module 300 can be easily aligned and disposed at a correct location, thereby improving convenience in assembly.

As shown in FIG. 10 and FIG. 11, the protruding portion 140 has a protruding portion sidewall 141 and a top face 143. The protruding portion sidewall 141 has a bottom end 1411 and a top end 1413 that are opposite to each other. The bottom end 1411 is connected to a side of the light bearing area 111, and the top end 1413 is connected to a side of the top face 143. Another side of the top face 143 is connected to a top of the groove sidewall 121. In this embodiment, the protruding portion 140 forms an elongated rib along a direction $D_{140}$. Therefore, the protruding portion sidewall 141 and the top face 143 both form long-edge planes, and the bottom end 141 and the top end 1413 of the protruding portion sidewall 141 also form linear edges. In addition, because the protruding portion 140 and the groove 120 may be formed in a machining manner such as plate punching or bending. Therefore, the foregoing junctions may be chamfered.

Figure 12:
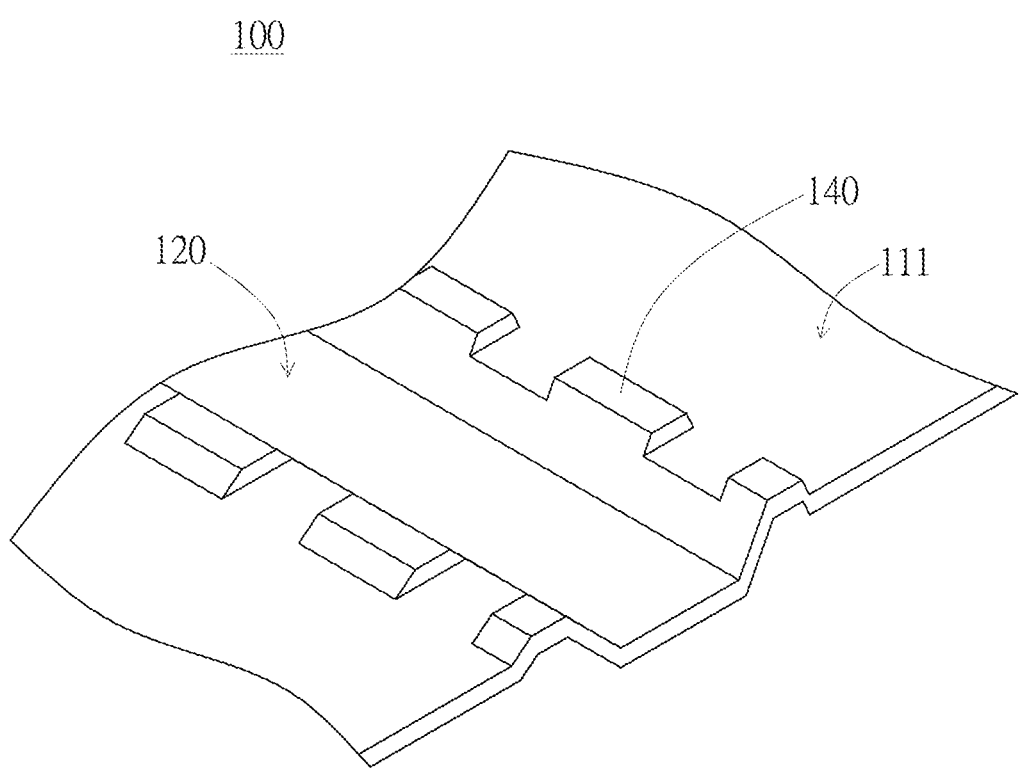
FIG. 12 is a schematic diagram of another embodiment of a bearing plate.

In the embodiment shown in FIG. 12, the protruding portion 140 may alternatively be distributed in a spaced manner. As shown in FIG. 12, a plurality of protruding portions 140 is distributed along the groove 120 in a spaced manner instead of that a strip-shaped protruding portion 140 is distributed along the groove 120 in the foregoing embodiment. In this embodiment, the protruding portions 140 are formed in an elongated block shape, and preferably, may be formed by punching a back side of the bearing plate 100. However, in different embodiments, the protruding portion 140 may alternatively formed in a dotted shape or another shape.

Figure 13:
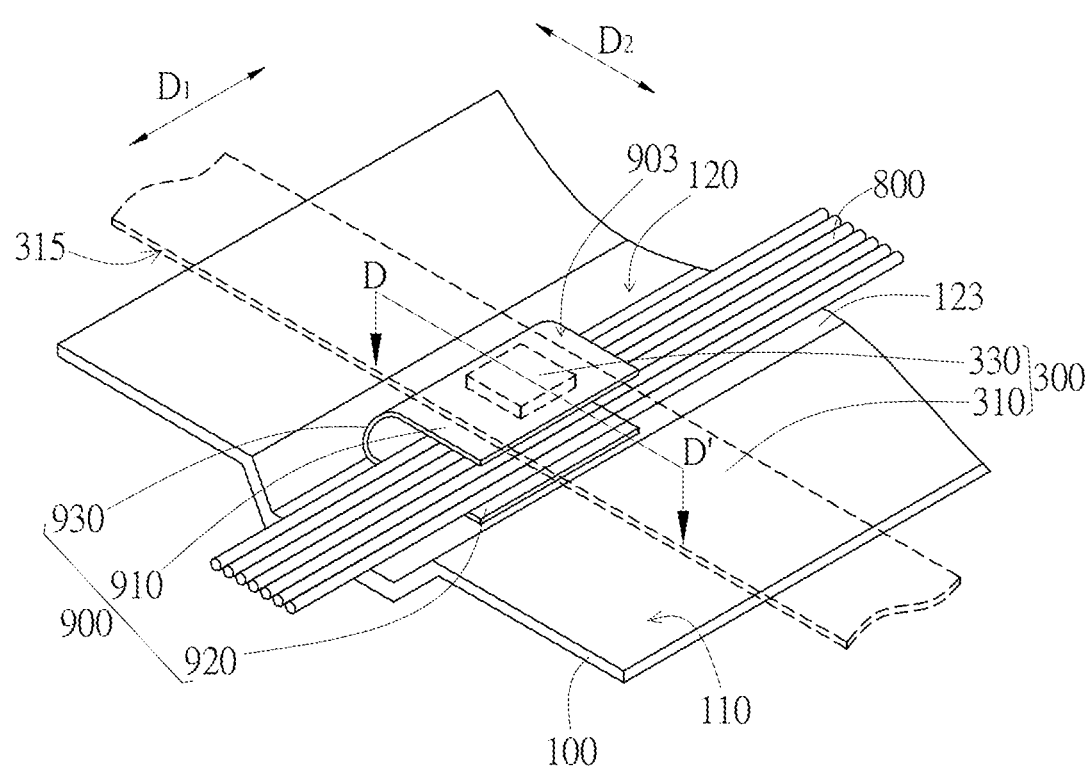
FIG. 13 is a schematic diagram of another embodiment of a backlight module.

FIG. 13 shows another embodiment of a backlight module. In this embodiment, the backlight module includes a bearing plate 100, a cooling fin 900, and a light module 300. A groove 120 on a bearing surface 110 of the bearing plate 100 includes an inner face 123. Preferably, the inner face 123 is a bottom face of the groove 120. However, it is not limited thereto. The groove 120 extends at least partially along a first extending direction $D_1$, and may intersect with the light module 300 at an angle. In this embodiment, the first extending direction $D_1$ is substantially perpendicular to a long edge direction of the light module 300. Similar to the foregoing embodiment, the groove 120 may be used for forming a protruding rib structure to reinforce strength of the bearing plate 100, accommodate a circuit, or another purpose.

The cooling fin 900 is disposed inside the groove 120, and is provided to conduct heat generated by the light module 300 to the bearing plate 100. The cooling fin 900 includes a first portion 910, a second portion 920, and a third portion 930. The first portion 910 and the second portion 920 are approximately flake-shaped and are arranged in a manner of being spaced from each other, to form a space 901 therebetween. Two ends of the third portion 930 are respectively connected to the first portion 910 and the second portion 920. In this embodiment, the cooling fin 900 is an elongated plate that is bent to form the first portion 910, the second portion 920, and the third portion 930, and forms a semitubular structure having a U-like cross-section.

Figure 14:
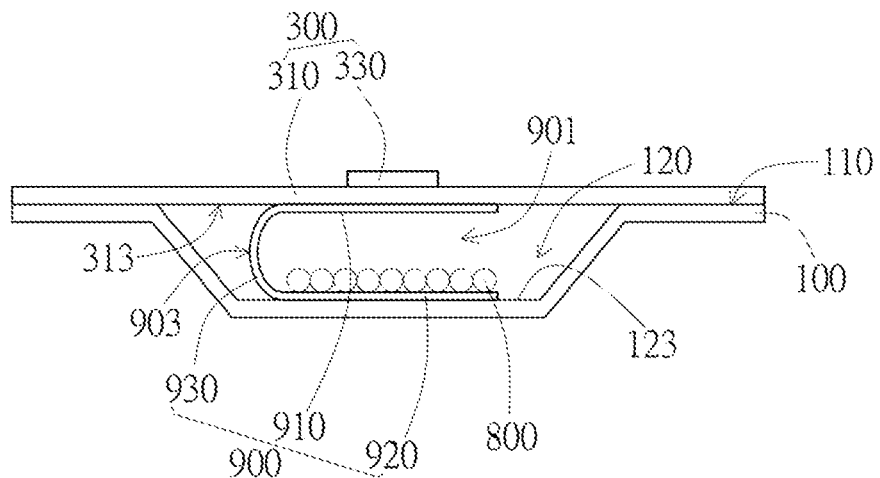
FIG. 14 is a cross-sectional view of the embodiment shown in FIG. 13.

FIG. 13 is an exploded view of elements of a backlight module 1000 of the present invention. FIG. 14 is a cross-sectional view of DD' in FIG. 13. As shown in FIG. 13 and FIG. 14, the light module 300 at least partially covers the groove 120 and has a bottom face 313. The first portion 910 is connected to the bottom face 313 of the light module 300, and the second portion 920 is connected to the inner face 920. The first portion 910 may transfer heat received by the light module 300 to the second portion 920 through the third portion 930, and then, transfer the heat to the inner face 123, to dissipate the heat. In this embodiment, because a surface of the first portion 910 in contact with the bottom face 313 and a surface of the second portion 920 in contact with the inner face 123, for example, are a same surface, heat is transferred more directly, and heat dissipation efficiency is higher. In addition, in this embodiment, the light module 300 includes a circuit substrate 310 and a light 330 disposed thereon. The light 330 may be a light-emitting diode or another electronic element or electronic element combination capable of generating light rays. Because heat is usually generated when the light 330 emits light, the light 330 is preferably superposed over the cooling fin 900, as shown in FIG. 13 and FIG. 14, so that the heat of the light 330 can be transferred more directly to the cooling fin 900.

In addition, as shown in FIG. 13 and FIG. 14, in this embodiment the backlight module may also include a circuit 800. The circuit 800 is at least partially accommodated inside the groove 120, and extends at least partially along a first extending direction $D_1$ to pass through a space 901 between the first portion 910 and the second portion 920. By means of such design, while producing a heat dissipation effect, the cooling fin 900 would not block disposition of the circuit 800. In addition, in different embodiments, a positioning device, such as a double-sided adhesive tape or a clamp, may be further disposed on the cooling fin 900, to position the circuit 800 inside the space 901.

Figure 15:
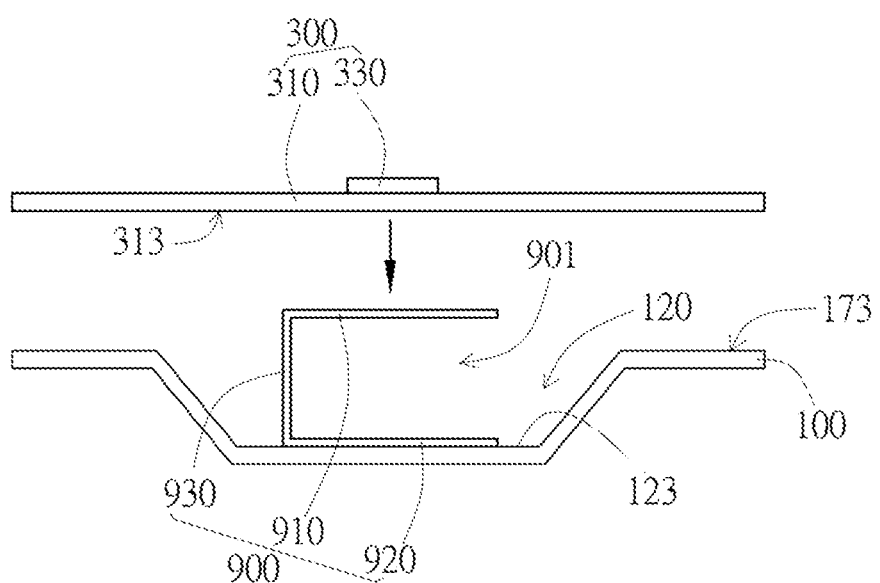
FIG. 15 is a schematic diagram of the embodiment shown in FIG. 14 before assembly.

As shown FIG. 15, before the light module 300 is assembled to the bearing plate 100, a height of the cooling fin 900 may be greater than a depth of the groove 120. That is, the first portion 910 protrudes out of the groove 120. Because at least the third portion 930 is elastic, when the circuit substrate 310 presses the cooling fin 900 downward, the third portion 930 may be bent, so that the first portion is flush with a bearing boss 173. By means of such a setting, after assembly is completed, a force is applied to the first portion 910 to press the first portion 910 toward the bottom face 313 because of elastic potential energy accumulated by the third portion 930, so that the first portion 910 gets in closer contact with the bottom face 313. In addition, likewise, the second portion 920 would also get in closer contact with the inner face 123 due to the same reason.

Figure 16:
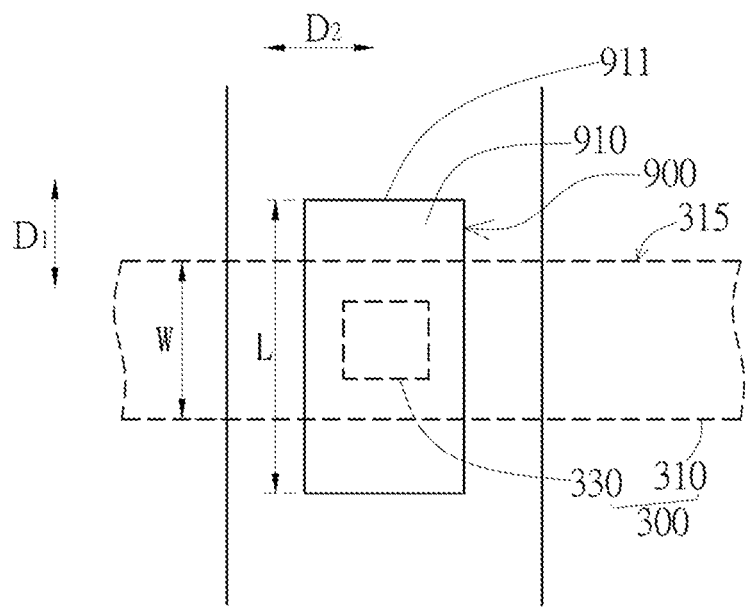
FIG. 16 is a top view of the embodiment shown in FIG. 13.

FIG. 16 is a top view of DD' in FIG. 13. As shown in FIG. 13 and FIG. 16, an end 911 of the cooling fin 900 protrudes out of a side edge 315 of the circuit substrate 310. The side edge 315 is preferably a long edge of the circuit substrate 310, and extends along a second extending direction $D_2$, where the second extending direction $D_2$ is different from the first extending direction $D_1$. In this embodiment, the second extending direction $D_2$ is substantially perpendicular to the first extending direction $D_1$. Specifically, as shown in FIG. 16, the first portion 910 of the cooling fin 900 has a length L in the first extending direction $D_1$, and the circuit substrate 310 has a width W in the first extending direction $D_1$, where the length L is greater than the width W. Therefore, at least one end 911 of the first portion 910 protrudes of the side edge 315. By means of such a setting, when it is attempted to separate the cooling fin 900 and the circuit substrate 310, a portion of the first portion 910 protruding from the side edge 315 may be pressed, to remove the circuit substrate 310 from the cooling fin 900.

Figure 17:
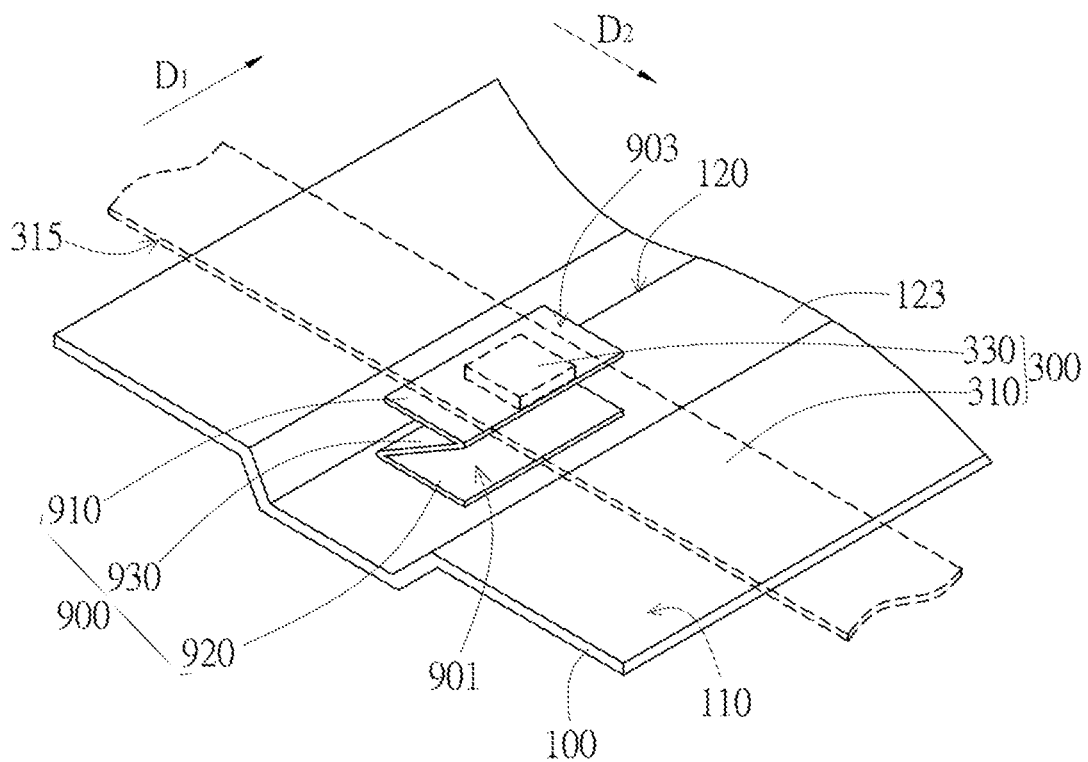
FIG. 17 is a schematic diagram of another embodiment of a cooling fin.

FIG. 17 shows another embodiment of a cooling fin 900. In this embodiment, two ends of the third portion 930 are respectively connected to an end of the first portion 910 and an end of the second portion 920, where the end of the first portion 910 and the end of the second portion 920 are opposite to each other. Therefore, a structure having a Z-shaped cross-section is formed. By means of such design, a space 901 between the first portion 910 and the second portion 920 may be spaced by the third portion 930, to accommodate different circuits or used for other purposes.

The present invention is described by means of the above-described relevant embodiments. However, the above-described embodiments are only examples for implementing the present invention. It should be pointed out that the disclosed embodiments do not limit the scope of the present invention. In contrast, the spirit included in the scope of the patent application and modifications and equivalent settings made within the scope are all included in the scope of the present invention.

SYMBOL DESCRIPTION

100 Bearing plate
110 Bearing surface
111 Light bearing area
120 Groove
121 Groove sidewall
123 Inner face
130 Trough
140 Protruding portion
141 Protruding portion sidewall
1411 Bottom end
1413 Top end
143 Top face
151 First inner stage
152 Second inner stage
171 First outer stage
172 Second outer stage
180 Depressed portion
210 First groove
220 Second groove
230 Communication groove
300 Light module
310 Circuit substrate
311 Gap
313 Bottom face
315 Side edge
330 Light
500 Glue
700 Reflection layer
710 Opening
800 Circuit
900 Cooling fin
901 Space
903 Surface
910 First portion
911 End of a cooling fin
920 Second portion
930 Third portion
1000 Backlight module
Direction $D_{210}$

What is claimed is:

1. A backlight module, comprising:
   a bearing plate, having a bearing surface, wherein the bearing surface comprises:
      a trough;
      a first groove disposed close to the trough;
      a first inner stage disposed between the trough and the first groove; and a first outer stage located on a side of the first groove opposite to the trough; and a light module, disposed on the bearing surface and corresponding to the trough, wherein comparing to the first inner stage, the first outer stage is more protruding toward the light module.

2. The backlight module according to claim 1, wherein a plate thickness of a portion of the bearing plate corresponding to the first inner stage is less than a plate thickness of a portion corresponding to the first outer stage.

3. The backlight module according to claim 1, wherein the bearing surface further comprises a second groove, a second inner stage, and a second outer stage, the second groove is disposed in juxtaposition with the first groove and on another side of the trough relative to the first groove, the second inner stage is disposed between the trough and the second groove, and the second outer stage is located a side of the second groove opposite to the trough, wherein comparing to the second inner stage, the second outer stage is more protruding toward the light module.

4. The backlight module according to claim 1, wherein the first groove forms a ring shape and surrounds the trough.

5. The backlight module according to claim 4, wherein a capacity of the first groove is not greater than two times a capacity of the trough.

6. The backlight module according to claim 4, wherein the bearing surface has a communication groove, and the communication groove is in communication with the trough and the first groove separately.

7. The backlight module according to claim 1, wherein comparing to the first inner stage, the first outer stage protrudes toward the light module by a first height, a portion of the bearing plate corresponding to the first outer stage has a plate thickness, and the first height is not greater than 20% of the plate thickness.

8. The backlight module according to claim 1, wherein the light module has a circuit substrate, an end of the circuit substrate is supported by the first outer stage, the circuit substrate covers the first groove and the trough, and there is a gap between the circuit substrate and the first inner stage.

9. The backlight module according to claim 8, wherein the light module has a light, and the light is disposed on the circuit substrate; and a vertical projection range of the light on the bearing surface at least partially overlaps the trough.

10. The backlight module according to claim 8, further comprising a reflection layer, the reflection layer at least partially covers the circuit substrate, and at least partially covers the bearing surface of the bearing plate.

11. The backlight module according to claim 8, wherein the bearing surface has a depressed portion that is disposed on the first outer stage and that is in communication with the first groove, wherein the depressed portion is at least partially uncovered by the circuit substrate.

12. The backlight module according to claim 11, wherein the depressed portion inclines toward a bottom of the first groove.

13. The backlight module according to claim 1, further comprising a glue, the glue is at least partially distributed between the trough and the light module, and is at least partially distributed between the first inner stage and the light module.

14. The backlight module according to claim 13, wherein the glue is at least partially distributed inside the first groove.

15. The backlight module according to claim 1, wherein the first inner stage inclines toward the first groove.

16. A backlight module, comprising:
a bearing plate, having a bearing surface, wherein the bearing surface comprises:
a light bearing area;
a groove, wherein the groove is disposed on a side of the light bearing area and is depressed relative to the light bearing area; and
at least one protruding portion disposed between the light bearing area and the groove, and distributed along the groove, wherein the protruding portion protrudes relative to the light bearing area; and
a light module disposed on the light bearing area, wherein the protruding portion is distributed along a side of the light module.

17. The backlight module according to claim 16, wherein the groove has a groove sidewall, and the protruding portion is disposed at a location at which the groove sidewall and the light bearing area are connected.

18. The backlight module according to claim 16, wherein the protruding portion comprises:
a protruding portion sidewall having a bottom end and a top end that face each other, wherein the bottom end is connected to a side of the light bearing area; and
a top face, wherein a side of the top face is connected to the top end of a sidewall of the protruding portion, and another side of the top face is connected to a top of a groove sidewall of the groove.

19. The backlight module according to claim 16, wherein the protruding portion forms a protruding rib.

20. The backlight module according to claim 16, further comprising a plurality of protruding portions, wherein the protruding portions are distributed along the groove in a spaced manner.

21. The backlight module according to claim 16, wherein the bearing plate has a plate thickness, and a height by which the protruding portion protrudes relative to the light bearing area is not less than ⅓ of the plate thickness.

22. A backlight module, comprising:
a bearing plate having a bearing surface, wherein the bearing surface has a groove, wherein the groove has an inner face and a first extending direction;
a cooling fin disposed inside the groove, wherein the cooling fin has a first portion, a second portion, and a third portion that connects the first portion and the second portion, wherein a space is formed between the first portion and the second portion; and
a light module at least partially covering the groove, wherein the light module has a bottom face, the first portion of the cooling fin is connected to the bottom face of the light module, wherein the second portion of the cooling fin is connected to the inner face of the groove.

23. The backlight module according to claim 22, further comprising a circuit, wherein the circuit is at least partially disposed inside the groove and extends along the first extending direction to pass through the space between the first portion and the second portion.

24. The backlight module according to claim 22, wherein the light module has a circuit substrate, wherein the circuit substrate has a side edge, wherein an end of the cooling fin protrudes out of the side edge of the circuit substrate.

25. The backlight module according to claim 22, wherein the light module has a circuit substrate, wherein the circuit substrate has a side edge, wherein the side edge extends along a second extending direction, and the second extending direction is different from the first extending direction of the groove.

26. The backlight module according to claim 22, wherein the light module has a circuit substrate, wherein a length of the cooling fin in the first extending direction of the groove is greater than a width of the circuit substrate in a same direction.

27. The backlight module according to claim 22, wherein a same face of the cooling fin is connected to the inner face of the groove and the bottom face of the light module.

28. The backlight module according to claim 22, wherein the light module has a light and a circuit substrate, wherein the light is configured on the circuit substrate, wherein the light and the cooling fin are superposed.

\* \* \* \* \*